J. T. & F. H. McCLENDON.
HITCHING DEVICE.
APPLICATION FILED APR. 8, 1911.
1,016,348.
Patented Feb. 6, 1912.
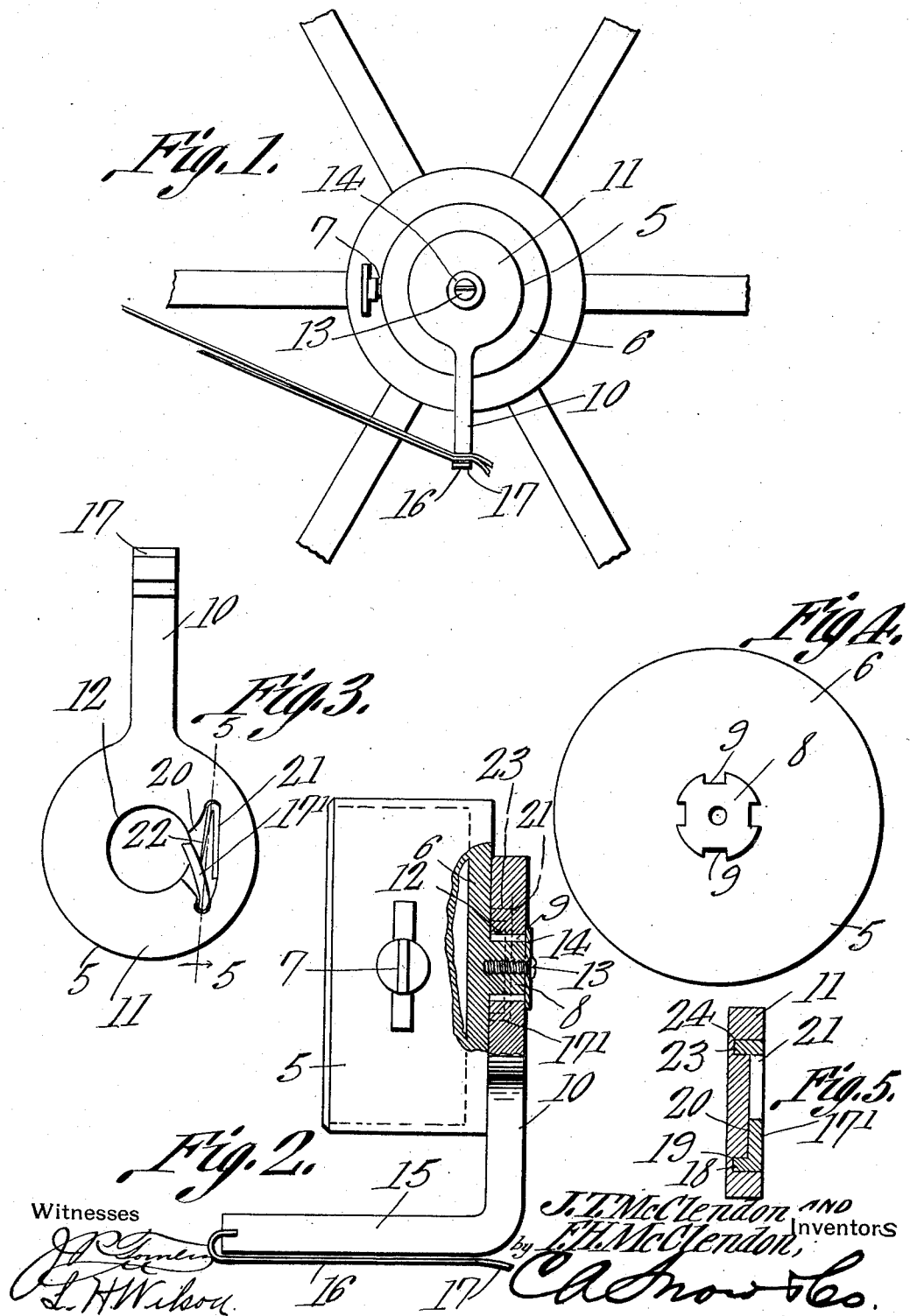

UNITED STATES PATENT OFFICE.

JAMES T. McCLENDON AND FRED H. McCLENDON, OF LUFKIN, TEXAS.

HITCHING DEVICE.

1,016,348.  Specification of Letters Patent.  Patented Feb. 6, 1912.

Application filed April 8, 1911. Serial No. 619,832.

*To all whom it may concern:*

Be it known that we, JAMES T. McCLENDON and FRED H. McCLENDON, citizens of the United States, residing at Lufkin, in the county of Angelina, State of Texas, have invented a new and useful Hitching Device, of which the following is a specification.

It is the object of the present invention to provide an improved hitching device of that type which is designed for attachment to one of the wheels of a vehicle and for the engagement therewith of the harness reins so that when the vehicle is moved forwardly, and the reins are engaged with the device, the latter will be drawn forcibly rearwardly thus arresting the movement of the draft animal.

It is one aim of the invention to so construct the device that it may be readily and quickly applied to and detached from the vehicle wheel and that the reins may be readily engaged with the device.

A further aim of the invention is to provide for attachment of the device to the vehicle wheel in such manner that injury to the wheel will not result when the device acts to arrest the forward movement of the vehicle and the draft animal drawing the same.

The invention further aims to so construct the device that all of the more delicate moving parts thereof will be housed and will consequently not be liable to become clogged with dirt.

In the accompanying drawings,—Figure 1 is a view in side elevation of the device applied to a vehicle wheel. Fig. 2 is a front elevation of the device, parts being shown in section. Fig. 3 is a view in side elevation of one member of the device detached. Fig. 4 is a view in end elevation of the hub cap of the device. Fig. 5 is a sectional view on the line 5—5 of Fig. 3.

In the drawings, the device is illustrated as including a hub cap 5 which is closed at one end as at 6 and is designed to be fitted upon the hub of any one of the wheels of the vehicle, it being held in place by means of a set screw 7. It is to be remarked at this point that the device may be permanently attached to the hub or it may be applied only at such times as when it is desirable to hitch the team. The hub cap 5 is formed upon its end 6 with an axially located stud 8 having notches 9 in its periphery.

The device also includes an arm 10 having a head 11 which is formed with an opening 12 in which is rotatably received the stud 8. A screw 13 is secured to a washer 14 disposed against the outer side of the head 11, and is threaded into the end of the stud 8, the head 11 being rotatably held upon the said stud, by this means. The arm 10 is bent to form a portion 15 which projects inwardly laterally parallel to the axis of the hub cap and spaced a short distance from the periphery of the said cap. A leaf spring 16 is secured at one end to the extremity of the portion 15 of the arm 10 and is bent to extend beside the said portion and slightly spaced therefrom as is clearly shown in Fig. 2 of the drawings. This spring has its free end bent outwardly as at 17 on a curve and this bent end is located opposite the bend in the arm 10 forming the portion 15.

As a means for holding the arm 10 for rotation with the hub cap 5, in one direction, and permitting of rotation of the hub cap independently of the arm, in an opposite direction, there is provided a dog 17′ which is formed with a stud 18 at one end seating in a socket 19 in the bottom wall of a recess 20 formed in that face of the head 11 which is disposed against the end 6 of the hub cap.
The dog 17′ is arranged to successively engage in the notches 9 in the stud 8 when the hub cap is rotated backwardly, as for example, when the vehicle is "backed" and its engagement in any one of these notches 9, when the hub cap is rotated forwardly, will result in a corresponding movement of the arm 10. A leaf spring 21 is also seated in the recess 20 and is bent to form a portion resting against one wall of the recess and a portion, indicated by the numeral 22, resting against the dog 17′ and holding the same in engagement with the periphery of the stud 8. At the bend between its portions 21 and 22, the spring is formed with a stud 23 which seats in a socket 24 in the said bottom wall of the recess 20.

In using the device, it is either permanently or temporarily applied to the hub of one wheel of the vehicle and the harness reins are inserted between the spring 16 and the portion 15 of the arm 10. Should the vehicle be drawn forwardly, rotation of the hub cap 5 will result in the arm 10 being rotated and in the harness reins being wound upon the hub cap. The pull exerted upon the reins will arrest the forward movement of the draft animal, as will be readily understood. When the vehicle is backed, the rotation of the hub cap will in no way effect the arm 11 and the latter will merely remain pendent.

What is claimed is:—

The combination with a vehicle hub of a rein hitching device removably attached over the outer end thereof and thereto, and having a slip-on cap, a notched stud axially located upon the cap, an arm rotatably fitted to the stud and having an inwardly laterally projecting portion arranged for the engagement therewith of harness reins, and a dog carried by the arm and coöperating with the notched stud to hold the arm for rotation in one direction with the hub cap.

In testimony that we claim the foregoing as our own, we have hereto affixed our signatures in the presence of two witnesses.

JAMES T. McCLENDON.
FRED H. McCLENDON.

Witnesses:
W. M. GLENN,
F. H. CURTIS.

---

Copies of this patent may be obtained for five cents each, by addressing the "Commissioner of Patents, Washington, D. C."